United States Patent
Hong et al.

(10) Patent No.: US 10,040,688 B2
(45) Date of Patent: Aug. 7, 2018

(54) METHOD FOR MANUFACTURING GRAPHITE OXIDE AND APPARATUS THEREFOR

(71) Applicant: Standardgraphene Co., Ltd., Ulsan (KR)

(72) Inventors: Sang Jin Hong, Seoul (KR); Sung Hun Eom, Ulsan (KR); Myung Sin Lee, Ulsan (KR)

(73) Assignee: STANDARDGRAPHENE CO., LTD., Ulsan (KR)

( * ) Notice: Subject to any disclaimer, the term of this patent is extended or adjusted under 35 U.S.C. 154(b) by 56 days.

(21) Appl. No.: 14/783,102

(22) PCT Filed: Mar. 28, 2014

(86) PCT No.: PCT/KR2014/002648
§ 371 (c)(1),
(2) Date: Dec. 2, 2015

(87) PCT Pub. No.: WO2014/168362
PCT Pub. Date: Oct. 16, 2014

(65) Prior Publication Data
US 2016/0101981 A1  Apr. 14, 2016

(30) Foreign Application Priority Data
Apr. 11, 2013 (KR) .................. 10-2013-0040038

(51) Int. Cl.
| | |
|---|---|
| *B01J 8/00* | (2006.01) |
| *C01B 31/04* | (2006.01) |
| *B01J 19/18* | (2006.01) |
| *C01B 32/23* | (2017.01) |

(52) U.S. Cl.
CPC ............. *C01B 31/043* (2013.01); *B01J 8/002* (2013.01); *B01J 8/006* (2013.01); *B01J 19/1862* (2013.01); *B01J 19/1893* (2013.01); *C01B 32/23* (2017.08)

(58) Field of Classification Search
CPC ................................. C01B 31/043; B01J 8/00
USPC ................. 422/187; 423/415.1, 414, 415.2
See application file for complete search history.

(56) References Cited

U.S. PATENT DOCUMENTS

| | | | | |
|---|---|---|---|---|
| 5,062,965 A | * | 11/1991 | Bernou | B01D 29/114 210/332 |
| 5,609,836 A | * | 3/1997 | McManus | B09C 1/06 210/170.01 |
| 5,942,108 A | * | 8/1999 | Yang | C02F 3/1263 210/195.3 |
| 7,322,431 B2 | * | 1/2008 | Ratcliff | B01D 17/00 166/177.1 |

(Continued)

FOREIGN PATENT DOCUMENTS

| | | |
|---|---|---|
| CN | 102275908 A | 12/2011 |
| CN | 102642828 A | 8/2012 |

(Continued)

OTHER PUBLICATIONS

Google translation of CN-102160995 A—Apr. 25, 2017.*

(Continued)

*Primary Examiner* — Huy Tram Nguyen
(74) *Attorney, Agent, or Firm* — Fox Rothschild LLP

(57) ABSTRACT

The present disclosure relates to a method for producing graphite oxide and an apparatus therefor.

16 Claims, 4 Drawing Sheets

(56) References Cited

U.S. PATENT DOCUMENTS

| | | | | |
|---|---|---|---|---|
| 2011/0253624 A1* | 10/2011 | Ewing | ................... | B01D 61/22 |
| | | | | 210/607 |
| 2012/0201738 A1* | 8/2012 | Kwon | ...................... | B01J 6/004 |
| | | | | 423/415.1 |
| 2014/0131281 A1* | 5/2014 | Morikawa | ............ | B01D 61/025 |
| | | | | 210/641 |

FOREIGN PATENT DOCUMENTS

| | | | | | |
|---|---|---|---|---|---|
| CN | 102807209 | A | | 12/2012 | |
| CN | 102160995 | A * | | 4/2017 | |
| JP | 2001-256976 | A | | 9/2001 | |
| JP | 2011-079701 | A | | 4/2011 | |
| KR | 10-1095584 | B1 | | 12/2011 | |
| KR | 10-1109961 | B1 | | 2/2012 | |
| KR | 2012-0134685 | A | | 12/2012 | |
| WO | WO 2011019095 | A1 * | | 2/2011 | .............. B01J 6/004 |
| WO | WO 2013002244 | A1 * | | 1/2013 | ........... B01D 61/025 |

OTHER PUBLICATIONS

ESPACENET translation of CN102160995A (downloaded on Jul. 25, 2017).

International Search Report for PCT/KR20141002648 dated Jul. 29, 2014.

\* cited by examiner

METHOD FOR MANUFACTURING GRAPHITE OXIDE AND APPARATUS THEREFOR

CROSS-REFERENCE TO RELATED APPLICATION

This application is the US National Phase of International Application PCT/KR2014/002648, filed Mar. 28, 2014, which claims the benefit of Korea Patent Application No. 10-2013-0040038, filed Apr. 11, 2013, the disclosures of which is incorporated herein by reference.

TECHNICAL FIELD

The present disclosure relates to a method for producing graphite oxide and an apparatus therefor.

BACKGROUND

In 2004, Professor Andre Geim et al. from the University of Manchester succeeded firstly mechanically exfoliated graphene from graphite by using "Scotch tape method" and found excellent electric conductivity of graphene through the study of a quantum hall effect by using the exfoliated graphene. In 2008, James Hone et al., researchers from Colombia University, confirmed superior strength of graphene. In the same year, Alexander Balandin et al., researchers from University of California, Riverside, measured thermal conductivity of graphene as 5,300 pW/mpK, which is double that of carbon nanotubes.

For preparation of graphene, exfoliation of graphite oxide by applying a thermal shock, exfoliation of graphite as carried out by Professor Andre Geim et al., surface growth, hydrazine reduction on graphite oxide sheet, chemical vapor deposition, and cutting nanotubes by reacting in a solution of permanganic acid and sulfuric acid have been known, but none of them go beyond laboratory preparation levels except exfoliation of graphite oxide by applying a thermal shock.

On the other hand, a method of producing expanded graphite, a shape of which is worm-like or accordion-like, by intercalating graphite flakes between graphite crystal layers by adding acids to the graphite flakes and adding a thermal shock thereto has been known since long before. Such worm-like expanded graphite is used as a filler or compression-processed to be used as a sheet having anisotropic conductivity. However, such expanded graphite resulting from loose bonding between layers of graphite is inferior to graphene in physical properties and its particle size is much bigger than graphene.

Further, during a producing process of graphite oxide, a reaction following of mixing acid and potassium permanganate is an exothermic reaction and during the mixing reaction, $Mn_2O_7$ produced by a reaction between the acid and the potassium permanganate may cause an explosion at about 55° C. or more. Thus, in this method, graphite oxide in a very small amount can be prepared only by a batch process and there is a limit on mass production of graphite oxide.

Furthermore, the graphite oxide produced as described above is dispersed in a solution containing strong acid and other ions. Therefore, in order to separate the graphite oxide, it is necessary to perform a washing process several times. By way of example, Korean Patent No. 1095584 discloses a washing method of graphite oxide with an organic solvent. However, even this method cannot sufficiently and efficiently remove ions and impurities contained in graphite oxide. Therefore, it is required to develop a process for solving the problems and allowing mass production of graphite oxide.

DETAILED DESCRIPTION OF THE INVENTION

Problems to be Solved by the Invention

The present disclosure is relates to a method for economically producing graphite oxide with excellent physical properties by using a sequencing batch mixer and a filtration membrane apparatus during a producing process of the graphite oxide, and an apparatus for producing the graphite oxide.

However, problems to be solved by the present disclosure are not limited to the above-described problems. Although not described herein, other problems to be solved by the present disclosure can be clearly understood by those skilled in the art from the following descriptions.

Means for Solving the Problems

In a first aspect of the present disclosure, there is provided a method for preparing graphite oxide, including: producing graphite slurry containing graphite and sulfuric acid; preparing graphite oxide slurry by injecting an oxidizing agent into the graphite slurry to oxidize the graphite; mixing a hydrogen peroxide solution into the graphite oxide slurry; and obtaining graphite oxide from the graphite oxide slurry by using a filtration membrane apparatus.

In a second aspect of the present disclosure, there is provided an apparatus for producing graphite oxide, including: a graphite slurry mixer configured to mix graphite with sulfuric acid to prepare graphite slurry; a sequencing batch mixer connected in series with the graphite slurry mixer and configured to supply an oxidizing agent to the graphite slurry; a batch reactor connected in series with the sequencing batch mixer; a hydrogen peroxide solution supplier connected to the batch reactor; and a filtration membrane apparatus connected in series with the batch reactor.

Effect of the Invention

According to a method for producing graphite oxide and an apparatus for producing the graphite oxide of the present disclosure, a filtration membrane apparatus including a filtration membrane tube is used to produce graphite oxide. Thus, swelling of graphite oxide in water is maximized so that, it is possible to obtain graphite oxide and graphene oxide excellent which are in dispersibility and also possible to easily remove an oxidizing agent, sulfuric acid, hydrogen peroxide, and other impurities without using a surfactant while maintaining a form of the graphene oxide. When graphite oxide is produced by the method for producing graphite oxide of the present disclosure, it is possible to suppress an explosion caused by localized overheating during a producing process and also possible to obtain graphite oxide which are excellent in dispersibility since swelling of the graphite oxide in water is maximized. Further, it is not necessary to perform a surface treatment to graphite oxide during a washing process for producing graphite oxide. Thus, a process can be simplified and costs can be reduced. Further, graphene oxide obtained from the graphite oxide can be applied in various ways.

BEST MODE FOR CARRYING OUT THE INVENTION

Figure 1:
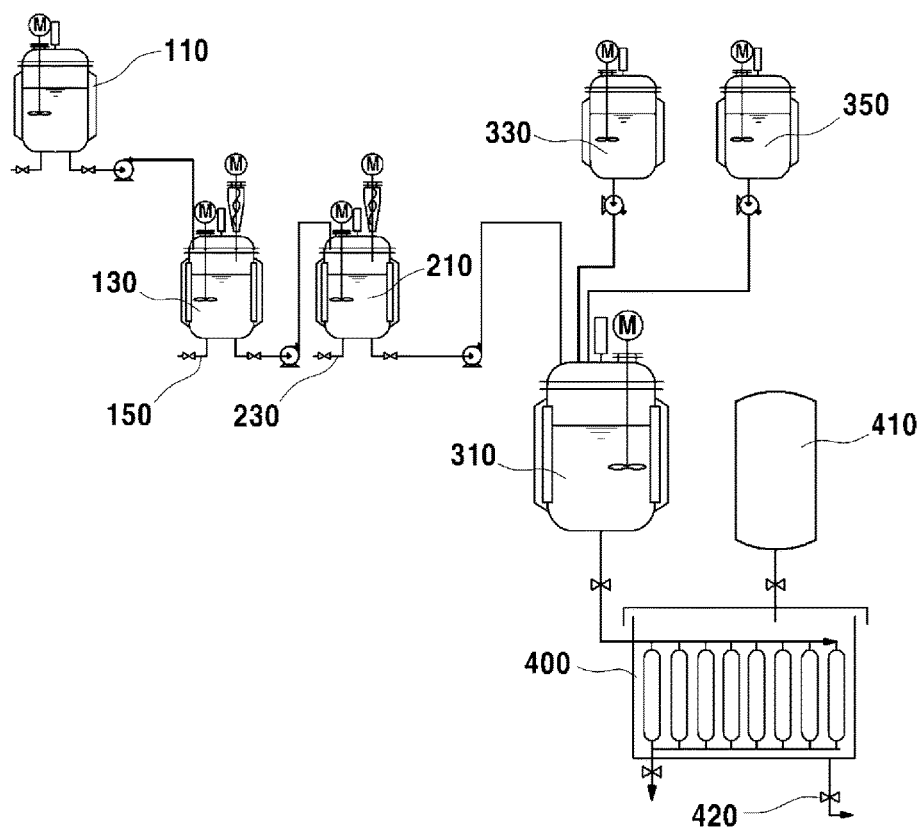
FIG. 1 is a schematic diagram of an apparatus used to perform a method for producing graphite oxide in accordance with an embodiment of the present disclosure.

Hereinafter, examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document of the present disclosure, the term "connected to" or "coupled to" that is used to designate a connection or coupling of one element to another element includes both a case that an element is "directly connected or coupled to" another element and a case that an element is "electronically connected or coupled to" another element via still another element.

Through the whole document of the present disclosure, the term "on" that is used to designate a position of one element with respect to another element includes both a case that the one element is adjacent to the another element and a case that any other element exists between these two elements.

Further, through the whole document of the present disclosure, the term "comprises or includes" and/or "comprising or including" used in the document means that one or more other components, steps, operation and/or existence or addition of elements are not excluded in addition to the described components, steps, operation and/or elements unless context dictates otherwise. Through the whole document of the present disclosure, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document of the present disclosure, the term "step of" does not mean "step for".

Through the whole document of the present disclosure, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document of the present disclosure, a phrase in the form "A and/or B" means "A or B, or A and B".

In a first aspect of the present disclosure, there is provided a method for producing graphite oxide, including: preparing graphite slurry containing graphite and sulfuric acid; preparing graphite oxide slurry by injecting an oxidizing agent into the graphite slurry to oxidize the graphite; mixing a hydrogen peroxide solution into the graphite oxide slurry; and obtaining graphite oxide from the graphite oxide slurry by using a filtration membrane apparatus.

By way of example, the filtration membrane apparatus may be an apparatus for removing remaining sulfuric acid, an oxidizing agent, hydrogen peroxide, and impurities generated during a producing process of graphite oxide from the graphite oxide slurry, but may not be limited thereto.

In accordance with an embodiment of the present disclosure, the method may further include: mixing water into the graphite oxide slurry, but may not be limited thereto.

FIG. 1 is a schematic diagram of an apparatus used to perform a method for producing graphite oxide in accordance with an embodiment of the present disclosure. Referring to FIG. 1, sulfuric acid is input into a graphite slurry mixer 130 from a sulfuric acid supplier 110, and graphite is supplied into the graphite slurry mixer through a graphite input port 150 connected to the graphite slurry mixer. Then, the graphite and the sulfuric acid are mixed to produce graphite slurry. The graphite slurry is transferred to a sequencing batch mixer 210 connected in series with the graphite slurry mixer. An oxidizing agent is supplied into the sequencing batch mixer through an oxidizing agent input port 230 connected to the sequencing batch mixer. Then, the oxidizing agent and the graphite slurry are mixed. The graphite is gradually oxidized by an oxidation reaction, and graphite oxide slurry is produced. The graphite oxide slurry is transferred to a batch reactor 310 connected in series with the sequencing batch mixer, and hydrogen peroxide and water are supplied into the batch reactor from a hydrogen peroxide supplier 330 and a water supplier 350 connected to the batch reactor. The oxidation reaction of the graphite oxide slurry is ended by the supplied hydrogen peroxide aqueous solution. Then, the graphite oxide slurry is transferred to a filtration membrane apparatus 400. Distilled water is supplied into the filtration membrane apparatus from a distilled water supplier 410 connected to the filtration membrane apparatus. The graphite oxide slurry passes through a filtration membrane tube in the filtration membrane apparatus. By osmotic pressure, remaining sulfuric acid, an oxidizing agent, hydrogen peroxide, and impurities contained in the graphite oxide slurry may be removed. The distilled water supplied into the filtration membrane apparatus may be discharged through a distilled water discharge port 420.

The filtration membrane apparatus may be an apparatus for removing remaining sulfuric acid, an oxidizing agent, hydrogen peroxide, and impurities from the graphite oxide slurry by osmotic pressure, but may not be limited thereto. If the filtration membrane apparatus is used, it is possible to easily remove impurities and the like while maintaining a form of graphene oxide included in the graphite oxide without using a surfactant or performing a surface treatment to the graphite oxide.

If the filtration membrane apparatus is used, swelling of graphite oxide is maximized by distilled water in the filtration membrane apparatus. Thus, exfoliation efficiency of the graphite oxide can be highly increased. If impurities contained in graphite oxide are removed by using a conventional filter press method or centrifuge method instead of using the filtration membrane apparatus, when the graphite oxide swells, a filter may be clogged or precipitation may be inhibited. Therefore, swelling of the graphite oxide cannot be sufficiently used, and, thus, exfoliation efficiency of the graphite oxide is low. Further, if the conventional filter press method or centrifuge method is used, it is necessary to perform a surface treatment to the graphite oxide. Thus, a process becomes complicated and costs are increased. Meanwhile, if the filtration membrane apparatus is used, swelling of the graphite oxide can be maximized, and, thus, it is possible to easily exfoliate the graphite oxide and also possible to easily remove impurities contained in the graphite oxide. Further, it is not necessary to perform a surface treatment. Therefore, it is possible to exfoliate and produce graphite oxide by a simple process with low cost. Furthermore, if the filtration membrane apparatus is used, it is not necessary to perform a surface treatment. Thus, an oxidative group of the produced graphene oxide may be possible to apply such as synthesis with other polymers and/or nanometal, but may not be limited thereto.

In accordance with an embodiment of the present disclosure, the injecting an oxidizing agent into the graphite slurry may be stepwisely performed by a multi-stage connected sequencing batch mixer, but may not be limited thereto. By way of example, the sequencing batch mixer may be multi-stage connected in series by about 10 stages or less, from about 2 stages to about 10 stages, from about 4 stages to about 10 stages, from about 6 stages to about 10 stages, from about 8 stages to about 10 stages, from about 2 stages to about 8 stages, from about 2 stages to about 6 stages, or from about 2 stages to about 4 stages, but may not be limited thereto. By way of example, such gradational injection of the oxidizing agent can suppress localized overheating and thus reduce the risk of explosions.

In accordance with an embodiment of the present disclosure, the oxidizing agent may contain an alkali metal salt, but may not be limited thereto.

In accordance with an embodiment of the present disclosure, the alkali metal salt may include a member selected from the group consisting of potassium chlorate, potassium permanganate, sodium nitrate, lithium hypochlorite, lithium perchlorate, lithium manganate, lithium nitrate, cesium nitrate, and combinations thereof, but may not be limited thereto.

In accordance with an embodiment of the present disclosure, the graphite slurry may contain the sulfuric acid in an amount of from about 30 parts by weight to about 70 parts by weight with respect to the graphite in an amount of about 1 part by weight, but may not be limited thereto. By way of example, the graphite slurry may contain the sulfuric acid in an amount of from about 30 parts by weight to about 70 parts by weight, from about 40 parts by weight to about 70 parts by weight, from about 50 parts by weight to about 70 parts by weight, from about 60 parts by weight to about 70 parts by weight, from about 30 parts by weight to about 60 parts by weight, from about 30 parts by weight to about 50 parts by weight, or from about 30 parts by weight to about 40 parts by weight with respect to the graphite in an amount of about 1 part by weight, but may not be limited thereto.

In accordance with an embodiment of the present disclosure, the graphite contained in the graphite slurry may have a particle size of about 100 μm or less, but may not be limited thereto. By way of example, the graphite contained in the graphite slurry may have a particle size of from about 1 μm or more to about 100 μm or less, from about 10 μm or more to about 100 μm or less, from about 30 μm or more to about 100 μm or less, from about 50 μm or more to about 100 μm or less, from about 80 μm or more to about 100 μm or less, from about 1 μm or more to about 80 μm or less, from about 1 μm or more to about 50 μm or less, from about 1 μm or more to about 30 μm or less, or from about 1 μm or more to about 10 μm or less, but may not be limited thereto.

In accordance with an embodiment of the present disclosure, distilled water in the filtration membrane apparatus may be replaced about 1 time or more, but may not be limited thereto. By way of example, distilled water in the filtration membrane apparatus may be replaced from about 1 time to about 100 times, from about 10 times to about 100 times, from about 50 times to about 100 times, from about 1 time to about 50 times, or from about 1 time to about 10 times, but may not be limited thereto.

Figure 2:
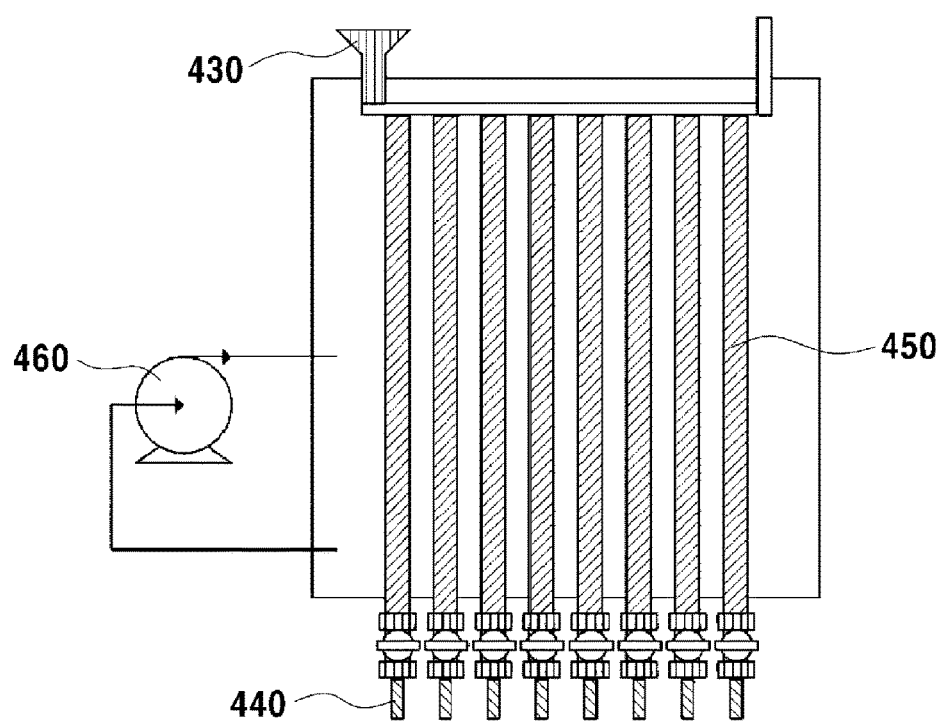
FIG. 2 is a schematic diagram of a filtration membrane apparatus used to perform a method for producing graphite oxide in accordance with an embodiment of the present disclosure.
Figure 3:
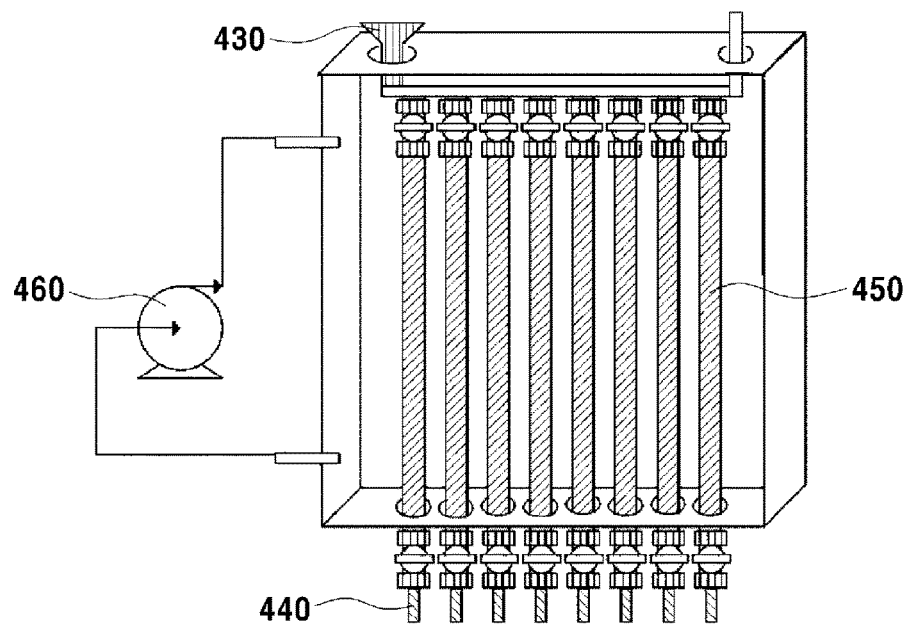
FIG. 3 is a schematic diagram of a filtration membrane apparatus used to perform a method for producing graphite oxide in accordance with an embodiment of the present disclosure.
Figure 4:
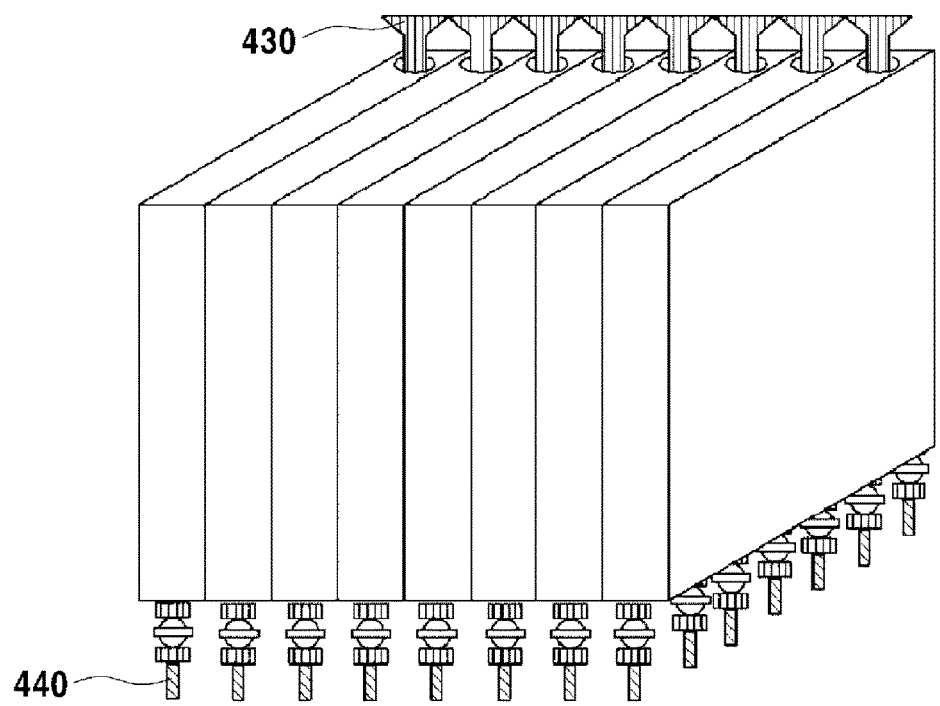
FIG. 4 is a schematic diagram of a filtration membrane apparatus used to perform a method for producing graphite oxide in accordance with an embodiment of the present disclosure.

FIG. 2 to FIG. 4 are schematic diagrams of the filtration membrane apparatus used to perform a method for producing graphite oxide in accordance with an embodiment of the present disclosure. The filtration membrane apparatus may include a graphite oxide input port 430 through which the graphite oxide slurry is input, a circulation pump 460 configured to circulate distilled water in the filtration membrane apparatus, a filtration membrane tube 450 configured to filter impurities including remaining sulfuric acid, an oxidizing agent, and hydrogen peroxide in the graphite oxide slurry, and a graphite oxide discharge port 440 through which the filtered graphite oxide is discharged.

In accordance with an embodiment of the present disclosure, the method may further include irradiating ultrasonic waves to the graphite oxide after the obtaining graphite oxide, but may not be limited thereto. If ultrasonic waves are irradiated to the graphite oxide sufficiently swelled during a washing process in the filtration membrane apparatus, it is possible to sufficiently exfoliate graphite oxide even by irradiating ultrasonic waves for a short time. As an ultrasonic wave irradiation time is decreased, a size of obtained graphene is increased. As a size of graphene is increased, a contact resistance between graphene is decreased. Thus, basic physical properties of the graphene may be improved, but may not be limited thereto.

In accordance with an embodiment of the present disclosure, the method may further include drying the graphite oxide after the obtaining graphite oxide, but may not be limited thereto.

In a second aspect of the present disclosure, there is provided an apparatus for producing graphite oxide, including: a graphite slurry mixer configured to mix graphite with sulfuric acid to prepare graphite slurry; a sequencing batch mixer connected in series with the graphite slurry mixer and configured to supply an oxidizing agent to the graphite slurry; a batch reactor connected in series with the sequencing batch mixer; a hydrogen peroxide solution supplier connected to the batch reactor; and a filtration membrane apparatus connected in series with the batch reactor.

FIG. 1 is a schematic diagram of an apparatus for producing graphite oxide in accordance with an embodiment of the present disclosure, and FIG. 2 to FIG. 4 are schematic diagrams of a filtration membrane apparatus included in the apparatus for producing graphite oxide in accordance with an embodiment of the present disclosure.

In an embodiment of the present disclosure, the apparatus may further include a water supplier connected to the batch reactor, but may not be limited thereto.

In accordance with an embodiment of the present disclosure, the sequencing batch mixer may be multi-stage connected in series by from about 2 stages to about 10 stages, but may not be limited thereto. By way of example, the sequencing batch mixer may be multi-stage connected in series by from about 2 stages to about 10 stages, from about 4 stages to about 10 stages, from about 6 stages to about 10 stages, from about 8 stages to about 10 stages, from about 2 stages to about 8 stages, from about 2 stages to about 6 stages, or from about 2 stages to about 4 stages, but may not be limited thereto.

In accordance with an embodiment of the present disclosure, the filtration membrane apparatus may include filtration membrane tubes of about 100 or less connected in parallel with each other, but may not be limited thereto. By way of example, the filtration membrane apparatus may include filtration membrane tubes of from about 1 to about 100, from about 10 to about 100, from about 50 to about 100, from about 1 to about 50, or from about 1 to about 10 connected in parallel with each other, but may not be limited thereto.

In accordance with an embodiment of the present disclosure, the filtration membrane apparatuses may be about 100 or less, but may not be limited thereto. By way of example, the filtration membrane apparatuses, may be from about 10 to about 100, from about 50 to about 100, from about 1 to about 50, or from about 1 to about 10, but may not be limited thereto.

In accordance with an embodiment of the present disclosure, distilled water in the filtration membrane apparatus may be replaced from about 1 time to about 100 times, but may not be limited thereto. By way of example, distilled water in the filtration membrane apparatus may be replaced from about 1 time to about 100 times, from about 10 times to about 100 times, from about 50 times to about 100 times, from about 1 time to about 50 times, or from about 1 time to about 10 times, but may not be limited thereto.

In accordance with an embodiment of the present disclosure, the apparatus may further include an ultrasonic irradiator connected to the filtration membrane apparatus, but may not be limited thereto.

In accordance with an embodiment of the present disclosure, the apparatus may further include a dryer connected to the filtration membrane apparatus or the ultrasonic irradiator, but may not be limited thereto.

Graphene can be obtained by a method known in the art from the graphite oxide produced by the method or apparatus for producing graphite oxide of the present disclosure, but may not be limited thereto. By way of example, graphene having excellent physical properties can be obtained through exfoliation by applying a thermal shock to the graphite oxide, but may not be limited thereto.

EXPLANATION OF CODES

110: Sulfuric acid supplier
130: Graphite slurry mixer
150: Graphite input port
210: Sequencing batch mixer
230: Oxidizing agent input port
310: Batch reactor
330: Hydrogen peroxide solution supplier
350: Water supplier
400: Filtration membrane apparatus
410: Distilled water supplier
420: Distilled water discharge port
430: Graphite oxide slurry input port
440: Graphite oxide discharge port
450: Filtration membrane tube
460: Circulation pump

MODE FOR CARRYING OUT THE INVENTION

Hereinafter, the present disclosure will be explained in detail with reference to the following Example. However, the following Example is provided only for the purpose of illustration and is not intended to limit the scope of the present disclosure.

EXAMPLE

In the present Example, concentrations of remaining metal ions in the produced graphite oxide were measured by using an inorganic element analysis (ICP) method and then compared. The concentrations of remaining metal ions in graphite oxide from which impurities were removed by the conventional filter press method or centrifuge method, and the concentrations of remaining metal ions in graphite oxide from which impurities were removed by using the filtration membrane apparatus of the present disclosure were as shown in the following Table 1. In the present Example, the inorganic element analysis was carried out by using an ICP-AES device (iCAP-6000 SERIES, Thermo electron). A pre-treatment was performed by using 3 mL of hydrochloric acid, 1 mL of nitric acid, and 1 mL of hydrofluoric acid. A sample in an amount of 0.1 g or more was collected by using a Teflon container. A primary dilution ratio was 25 mL and a secondary dilution ratio was 50 mL.

TABLE 1

|  | $K^+$ ion concentration (ppm) | $Mn^{2+}$ ion concentration (ppm) |
| --- | --- | --- |
| Filter press method | 1100 | 325 |
| Centrifuge method | 964 | 1501 |
| Filtration membrane method | 318 | 71 |

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method for producing graphite oxide comprising:
   preparing graphite slurry containing graphite and sulfuric acid;
   preparing graphite oxide slurry by injecting an oxidizing agent into the graphite slurry to oxidize the graphite;
   mixing a hydrogen peroxide solution into the graphite oxide slurry; and obtaining graphite oxide from the graphite oxide slurry by using an osmotic pressure filtration membrane apparatus.

2. The method of claim 1, wherein the injecting the oxidizing agent into the graphite slurry is stepwisely performed by a multi-stage connected sequencing batch mixer.

3. The method of claim 1, wherein the oxidizing agent contains an alkali metal salt.

4. The method of claim 3, wherein the alkali metal salt includes a member selected from the group consisting of potassium chlorate, potassium permanganate, sodium nitrate, lithium hypochlorite, lithium perchlorate, lithium manganate, lithium nitrate, cesium nitrate, and combinations thereof.

5. The method of claim 1, wherein the graphite slurry contains the sulfuric acid in an amount of from 30 parts by weight to 70 parts by weight with respect to the graphite in an amount of 1 part by weight.

6. The method of claim 1, wherein the graphite contained in the graphite slurry has a particle size of 100 μm or less.

7. The method of claim 1, further comprising:
irradiating ultrasonic waves to the graphite oxide after the obtaining graphite oxide.

8. The method of claim 1, further comprising:
drying the graphite oxide after the obtaining graphite oxide.

9. An apparatus for producing graphite oxide, comprising:
a graphite slurry mixer configured to mix graphite with sulfuric acid to prepare a graphite slurry;
a sequencing batch mixer connected in series with the graphite slurry mixer and configured to supply an oxidizing agent to the graphite slurry; followed by
a batch reactor connected in series with the sequencing batch mixer; followed by
one or more osmotic pressure filtration membrane apparatuses connected in series with the batch reactor;
wherein a hydrogen peroxide solution supplier is connected to the batch reactor.

10. The apparatus of claim 9, further comprising a water supplier connected to the batch reactor.

11. The apparatus of claim 9, wherein the sequencing batch mixer is a multi-stage batch mixer containing from 2 stages to 10 stages connected in series.

12. The apparatus of claim 9, wherein at least one osmotic pressure filtration membrane apparatus includes 1 to about 100 osmotic filtration membrane tubes connected in parallel with each other, with circulating distilled water surrounding them.

13. The apparatus of claim 9, comprising up to 100 osmotic pressure filtration membrane apparatuses.

14. The apparatus of claim 9, further comprising an ultrasonic irradiator connected to each of the one or more osmotic pressure filtration membrane apparatuses, wherein said ultrasonic irradiator is configured to exfoliate graphite oxide.

15. The apparatus of claim 9, further comprising a dryer connected to each of the one or more osmotic pressure filtration membrane apparatuses.

16. The apparatus of claim 14, further comprising a dryer connected to the ultrasonic irradiator.

* * * * *